United States Patent [19]
Bordini et al.

[11] 4,387,135
[45] * Jun. 7, 1983

[54] METALIZED BONDED SHEETS COMPRISING A POLYOLEFINIC FILM AND A POLYCHLOROVINYL FILM

[75] Inventors: Fosco Bordini; Luigi Mauri, both of Terni, Italy

[73] Assignee: Moplefan S.p.A., Milan, Italy

[*] Notice: The portion of the term of this patent subsequent to Jul. 8, 1997, has been disclaimed.

[21] Appl. No.: 128,089

[22] Filed: Mar. 7, 1980

[30] Foreign Application Priority Data

Mar. 9, 1979 [IT] Italy ............................... 20852 A/79

[51] Int. Cl.$^3$ ............................................. B32B 15/08
[52] U.S. Cl. ...................................... 428/220; 428/35; 428/461; 428/463; 428/518; 428/522
[58] Field of Search ................. 428/461, 463, 518, 35, 428/332, 522; 229/35 MF; 426/126

[56] References Cited

U.S. PATENT DOCUMENTS

| | | | |
|---|---|---|---|
| 3,136,468 | 6/1964 | Keller | 426/126 |
| 3,836,679 | 9/1974 | Seiferth et al. | 426/126 |
| 4,211,811 | 7/1980 | Bordini | 156/334 |
| 4,278,716 | 7/1981 | Buchner | 428/522 |

FOREIGN PATENT DOCUMENTS 2920456  6/1979  Fed. Rep. of Germany ...... 428/458

*Primary Examiner*—George F. Lesmes
*Assistant Examiner*—E. Rollins Buffalow
*Attorney, Agent, or Firm*—Stevens, Davis, Miller & Mosher

[57] ABSTRACT

A bonded sheet for packaging is disclosed having a thickness of from 20 to 200 microns and comprising two films, one of which is obtained from chlorovinyl polymers and the other from olefinic polymers, and characterized in that one of the two films has, on its surface in contact with the other film, a metalized coating with a resistivity of from 1 to 5 Ohms. The chlorovinyl polymer film is a film, optionally stretched, prepared from polymers or copolymers of vinyl chloride, having a Fikentscher value K of from 40 to 80. The polyolefinic film is a film, optionally oriented by stretching, prepared from a polymer selected from the class consisting of a polyethylene with a melt index of from 0.5 to 15, a polypropylene with a melt index of from 1 to 20, a crystalline propylene/ethylene copolymer containing from 0.1 to 15% by weight of ethylene and with a melt index of from 1 to 20, or mixtures thereof. The metalized layer preferably consists of aluminum, and at least one of the two films is coated with a thermowelding layer.

3 Claims, No Drawings

METALIZED BONDED SHEETS COMPRISING A POLYOLEFINIC FILM AND A POLYCHLOROVINYL FILM

This invention relates to metalized bonded sheets comprising a polyolefinic film and a polychlorovinyl film, one of the two films having, on its surface in contact with the other film, a metalized coating.

U.S. application Ser. No. 861,945, filed Dec. 19, 1977, now U.S. Pat. No. 4,211,811 describes bonded sheets comprising two polyolefinic films, one of which is an oriented film of polypropylene and at least one of the two films having, on its surface in contact with the other film, a metalized coating.

Carrying on with studies and research in this field, it has now been found that it is possible to obtain bonded sheets of the type described in the aforesaid application, but desirably characterized by a lower weldability temperature, by substituting a film of vinyl chloride polymers for the oriented film of polypropylene.

It is therefore the object of the present invention to provide bonded sheets for packing having a high resistance to gas or vapor diffusion, a low transmittance of ultraviolet light, high antistatic characteristics, as well as high values of thermoweldability, resistance of the weld, resistance to perforation, together with excellent mechanical and esthetic properties. Such bonded sheets comprise two films, one of which is prepared from chlorovinyl polymers and the other from olefinic polymers, and being characterized in that one of the two films has, on its surface in contact with the other film, a metalized coating having a surface resistivity of from 1 to 5 Ohms.

Chlorovinyl polymers which have proved suitable for use according to this invention include polymers and copolymers of vinyl chloride, in particular polyvinyl chloride and the vinyl chloride/vinyl acetate copolymers with a Fikentscher K value of from 40 to 80, in the form of both stretched and unstretched films.

Olefinic polymers which have proved suitable for use according to the present invention include crystalline polymers of ethylene, of propylene, ethylene/propylene copolymers containing predominantly propylene, as well as mixtures thereof, in the form of stretched or unstretched films.

If oriented films are employed, it is advisable to coat one of the films with a thermowelding layer, in order to impart also the necessary thermoweldability to the external surface of the bonded sheet.

In the olefinic films the polypropylene has a melt index preferably of from 5 to 20, the polyethylene of from 0.5 to 15, and the ethylene-propylene copolymers of from 3 to 20, the ethylene content of the copolymers being preferably of from 0.1 to 15%.

In the mixtures, polyethylene and ethylene/propylene copolymers are employed at the rate of from 1 to 50% by weight based on the total olefinic polymers.

The bonding of the two films without interposed adhesive and/or the coating of one of the films with a thermowelding layer (which may consist also of polyethylene, crystalline ethylene/propylene copolymers, and mixtures of polyethylene and ethylene/propylene copolymers) can be carried out also by the so-called extrusion coating method.

Metalization is carried out under vacuum using, as a metal, aluminum, zinc, gold, palladium or cadmium, preferably on films optionally subjected to a continuous, non-perforating electric discharge treatment.

The most economical and suited metalization for packing purposes is the one with aluminum.

Each film of the bonded sheet has a thickness preferably of from 10 to 100 microns.

The bonded sheets are generally prepared by lamination of the two films with each other, with or without an interposed adhesive, by causing them to pass between rollers heated to from 30° to 90° C.

When an adhesive is used, it is applied onto one film face, according to conventional methods, preferably by spreading using a solution or dispersion of adhesive in water or an organic solvent.

Generally, a solution having an adhesive concentration of from 5 to 40% by weight is employed, in order to have an amount of adhesive on the film of from 1 to 10 $g/m^2$ of surface.

Adhesives which have proved particularly suitable are the synthetic adhesives consisting of thermoplastic resins, such as cellulose esters and ethers, alkyl and acrylic esters, polyamides, polyurethanes, polyesters, or of thermosetting resins, such as epoxy resins, urea/formaldehyde, phenol/formaldehyde, melamine/formaldehyde resins, and synthetic rubbers.

As solvents for the adhesive, hydrocarbons such as ligroin, esters such as ethyl acetate, or ketones such as acetone and methyl ethyl ketone may be used.

The films to be bonded according to this invention may be prepared from chlorovinyl and olefin polymers to which known additives, such as opacifiers, stabilizers, lubricants, fillers, antistatic agents, dyeing organic and inorganic pigments, may be added prior to film formation.

The films to be bonded may be subjected to a superficial pre-treatment with continuous, non-perforating electric discharges, or with chemical agents, in order to increase their adhesive receptivity, and may be lacquered in order to improve their thermoweldability.

The bonded sheets according to this invention are utilized in the field of packing for foodstuffs, including packing of products under vacuum.

The transmittance measurements were carried out by spectrophotometry. The permeability to water vapor was evaluated according to ASTM-E-96 (tropical conditions), the permeability to the other gases according to ASTM-D-1434, both at 25° C.

The resistance of the weld of the bonded sheets was measured according to the peeling strength test method, evaluating the tensile strength of the weld by means of a dynamometer (for example, an Instron dynamometer).

The resistance to perforation of the bonded sheets was measured by means of a dynamometer of the Instron type, using a punch having a diameter of 1.4 mm and a union of 0.7 mm.

Wide variations and changes may be brought about in the various embodiments of the present invention, without departing however from the spirit and scope of the invention.

The following examples are given in order still better to illustrate the invention, without however being a limitation thereof.

EXAMPLE 1

A bonded sheet was prepared by conveying between rollers heated to 60° C.:

(A) an unoriented polyolefinic film, having been treated with continuous, non-perforating electric discharge, and having the following characteristics:
thickness: 25 microns
longitudinal tensile strength: 6 kg/mm$^2$
transverse tensile strength: 3.5 kg/mm$^2$
longitudinal elongation: 500%
transverse elongation: 700%
resistance to tearing (Elmendorf):
   longitudinal: 20 g/25 microns
   transverse: 150 g/25 microns The polyolefinic film was obtained by preparing a film from polypropylene having prevailingly isotactic macromolecules, prepared in the well known way by means of stereospecific catalysts, and having a melt index of 10, a residue after extraction with heptane of 96.5%, and an ash content of 75 ppm (parts per million). The treated face of the film was coated with a polyurethane-based adhesive in an amount of 1.5 g/m$^2$ of surface; and (B) a film obtained from a chlorovinyl polymer, coated on one face with 1.5 g/m$^2$ of a vinyl lacquer and metalized under vacuum on the other face with aluminum (surface resistivity=2 Ohms), and having the following characteristics:
thickness: 20 microns
longitudinal tensile strength: 7 kg/mm$^2$
transverse tensile strength: 6 kg/mm$^2$
longitudinal elongation: 190%
transverse elongation: 230%
resistance to teating (Elmendorf):
   longitudinal: 25 g/25 microns
   transverse: 50 g/25 microns The chlorovinyl film was obtained by preparing a film from polyvinyl chloride, having a Fikentscher K value of 55. The metalized face was in contact with the adhesive-coated face of the polyolefinic film. The resulting bonded sheet had the following characteristics:
thickness: 47 microns
transmittance: 1%
permeability:
   to oxygen: 40 cm$^3$/m$^2$.24 h.kg/cm$^2$
   to carbon dioxide: 160 cm$^3$/m$^2$.24 h.kg/cm$^2$
   to water vapor: 2 g/m$^2$.24 h
weldability range: 90°–110° C.
resistance of the weld: 400 g/cm
resistance to perforation: 1000 g

EXAMPLE 2

A bonded sheet was prepared by conveying between rollers heated to 60° C.:
(A) a polyolefinic film bioriented by stretching in the longitudinal and transverse directions, having been treated with continuous, non-perforating electric discharges, and having the following characteristics:
thickness: 25 microns
longitudinal tensile strength: 13 kg/mm$^2$
transverse tensile strength: 28 kg/mm$^2$
longitudinal elongation: 180%
transverse elongation: 45%
resistance to tearing (Elmendorf): 11 g/25 microns The polyolefinic film was obtained by preparing a film from polypropylene having prevailingly isotactic macromolecules, prepared in the well known way by means of stereospecific catalysts, and having a melt index of 4, a residue after extraction with heptane of 96.5%, and an ash content of 75 ppm. The treated face of the film was coated with a polyurethane-based adhesive in an amount of 1.5 g/m$^2$ of surface; and (B) a film prepared from a chlorovinyl polymer, coated on one face with 1.5 g/m$^2$ of vinyl lacquer and metalized under vacuum on the other face with aluminum (surface resistivity=2 Ohms), and having the following characteristics:
thickness: 20 microns
longitudinal tensile strength: 7 kg/mm$^2$
transverse tensile strength: 6 kg/mm$^2$
longitudinal elongation: 190%
transverse elongation: 230%
resistance to tearing (Elmendorf):
   longitudinal: 25 g/25 microns
   transverse: 50 g/25 microns The chlorovinyl film was obtained by preparing a film from polyvinyl chloride, having a Fikentscher K value of 55. The metalized face was in contact with the adhesive-coated face of the polyolefinic film. The resulting bonded sheet had the following characteristics:
thickness: 46.5 microns
transmittance of ultraviolet light: 1%
permeability:
   to oxygen: 30 cm$^3$/m$^2$.24 h.kg/cm$^2$
   to carbon dioxide: 140 cm$^3$/m$^2$.24 h.kg/cm$^2$
   to water vapor: 1.5 g/m$^2$.24 h
weldability range: 90°–110° C.
resistance of the weld: 450 g/cm
resistance to perforation: 1200 g

EXAMPLE 3

A bonded sheet was prepared by conveying between rollers heated to 60° C.:
(A) an unoriented polyolefinic film, having been treated with continuous, non-perforating electric discharges, and having the following characteristics:
thickness: 25 microns
longitudinal tensile strength: 5.8 kg/mm$^2$
transverse tensile strength: 3.3 kg/mm$^2$
longitudinal elongation: 550%
transverse elongation: 750%
resistance to tearing (Elemendorf):
   longitudinal: 25 g/25 microns
   transverse: 160 g/25 microns The polyolefinic film was obtained by preparing a film from a random block crystalline ethylene/propylene copolymer containing 2.5% of ethylene, and having a melt index of 12 and a melting point of 153° C. The treated face of the film was coated with a polyurethane-based adhesive in an amount of 1.5 g/m$^2$ of surface; and (B) a film prepared from a polymer of vinyl chloride, coated on one face with 1.5 g/m$^2$ of vinyl lacquer and metalized under vacuum on the other face with aluminum (surface resistivity=2 Ohms), and having the following characteristics:
thickness: 20 microns
longitudinal tensile strength: 7 kg/mm$^2$
transverse tensile strength: 6 kg/mm$^2$
longitudinal elongation: 190%
transverse elongation: 230%
resistance to tearing (Elmendorf):
   longitudinal: 25 g/25 microns
   transverse: 50 g/25 microns The chlorovinyl film was obtained by preparing a film from polyvinyl chloride having a Fikentscher value K of 55. The metalized face was in contact with the adhesive-coated face of the polyolefinic film. The bonded sheet had the following characteristics:
thickness: 47 microns
transmittance: 1%
permeability:
    to oxygen: 45 cm$^3$/m$^2$.24 h.kg/cm$^2$
    to carbon dioxide: 170 cm$^3$/m$^2$.24 h.kg/cm$^2$
    to water vapor: 2.5 g/m$^2$.24 h
weldability range: 90°–110° C.
resistance of the weld: 400 g/cm
resistance to perforation: 950 g

EXAMPLE 4

A bonded sheet was prepared by conveying between rollers heated to 60° C.:
(A) an unoriented polyolefinic film, having been subjected to continuous, non-perforating electric discharges, and having the following characteristics:
thickness: 25 microns
longitudinal tensile strength: 5.9 kg/mm$^2$
transverse tensile strength: 3.2 kg/mm$^2$
longitudinal elongation: 530%
transverse elongation: 800%
resistance to tearing (Elmendorf):
    longitudinal: 30 g/25 microns
    transverse: 150 g/25 microns
The polyolefinic film was obtained by preparing a film from a mixture containing 90% by weight of polypropylene having a melt index of 10, a residue after extraction with heptane of 96.5%, and an ash content of 75 ppm, and 10% by weight of low-density polyethylene having a melt index of 2, and a melting point of 100° C. The treated face of the film was coated with a polyurethane-based adhesive in an amount of 1.5 g/m$^2$ of surface; and
(B) a film prepared from a polymer of vinyl chloride, coated on one face with 1.5 g/m$^2$ of vinyl lacquer and metalized under vacuum on the other face with aluminum (surface resistivity=2 Ohms), and having the following characteristics:
thickness: 20 microns
longitudinal tensile strength: 7 kg/mm$^2$
transverse tensile strength: 6 kg/mm$^2$
longitudinal elongation: 190%
transverse elongation: 230%
resistance to tearing (Elmendorf):
    longitudinal: 25 g/25 microns
    transverse: 50 g/25 microns
The chlorovinyl film was obtained by preparing a film from polyvinyl chloride, having a Fikentscher value K of 55. The metalized face was in contact with the adhesive-coated face of the polyolefinic film. The resulting bonded sheet had the following characteristics:
thickness: 47 microns
transmittance: 1%
permeability:
    to oxygen: 40 cm$^3$/m$^2$.24 h.kg/cm$^2$
    to carbon dioxide: 160 cm$^3$/m$^2$24 h.kg/cm$^2$
    to water vapor: 2 g/m$^2$.24 h
weldability range: 90°–110° C.
resistability of the weld: 400 g/cm
resistance to perforation: 1000 g

EXAMPLE 5

A bonded sheet was prepared by conveying between rollers heated to 60° C.:
(A) an unoriented polyolefinic film, having been subjected to continuous, non-perforating electric discharges, and having the following characteristics:
thicknes: 25 microns
longitudinal tensile strength: 6 kg/mm$^2$
transverse tensile strength: 3.5 kg/mm$^2$
longitudinal elongation: 500%
transverse elongation: 700%
resistance to tearing (Elmendorf):
    longitudinal: 20 g/25 microns
    transverse: 150 g/25 microns
The polyolefinic film was obtained by preparing a film from polypropylene having prevailingly isotactic macromolecules, prepared in the well known way by means of stereospecific catalysts, having a melt index of 10, a residue after extraction with heptane of 96.5%, and an ash content of 75 ppm. The treated face of the film was coated with a polyurethane-based adhesive in an amount of 1.5 g/m$^2$ of surface; and
(B) a film prepared from a polymer of vinyl chloride, coated on one face with 1.5 g/m$^2$ of vinyl lacquer and metalized under vacuum on the other face with aluminum (surface resistivity=2 Ohms), and having the following characteristics:
thickness: 20 microns
longitudinal tensile strength: 6.8 kg/mm$^2$
transverse tensile strength: 5.9 kg/mm$^2$
longitudinal elongation: 190%
transverse elongation: 230%
resistance to tearing (Elmendorf):
    longitudinal: 25 g/25 microns
    transverse: 30 g/25 microns
The chlorovinyl film was obtained by preparing a film from a vinyl chloride/vinyl acetate (90/10) copolymer having a Fikentscher K value of 60. The metalized face was in contact with the adhesive-coated face of the polyolefinic film. The bonded sheet so obtained exhibited the following characteristics:
thickness: 47 microns
transmittance: 1%
permeability:
    to oxygen: 40 cm$^3$/m$^2$.24 h.kg/cm$^2$
    to carbon dioxide: 150 cm$^3$/m$^2$24 h.kg/cm$^2$
    to water vapor: 2 g/m$^2$.24 h
weldability range: 90°–110° C.
resistance of the weld: 400 g/cm
resistance to perforation: 1000 g

EXAMPLE 6

A bonded sheet was prepared by conveying between rollers heated to 60° C.:
(A) a polyolefinic film bioriented by stretching longitudinally and transversely, treated with continuous, non-perforating electric discharges and metalized under vacuum on one face with aluminum (surface resistivity=2 Ohms), and having the following characteristics:
thickness: 25 microns
longitudinal tensile strength: 13 kg/mm$^2$
transverse tensile strength: 28 kg/mm$^2$
longitudinal elongation: 180%
transverse elongation: 45%
reisistance to tearing (Elmendorf): 11 g/25 microns
The polyolefinic film was obtained by preparing a film from polypropylene having prevailingly isotactic macromolecules, prepared in the well known way by means of stereospecific catalysts, having a melt index of 4, a residue after extraction with heptane of 96.5%, and an ash content of 75 ppm. The metalized face of the film was coated with a polyurethane-based adhesive in an amount of 1.5 g/m² of surface; and (B) a film prepared from a polymer of vinyl chloride, coated on one face with 1.5 g/m² of vinyl lacquer, having the following characteristics:
thickness: 20 microns
longitudinal tensile strength: 7 kg/mm²
transverse tensile strength: 6 kg/mm²
longitudinal elongation: 190%
transverse elongation: 230%
resistance to tearing (Elmendorf):
  longitudinal: 254 g/25 microns
  transverse: 50 g/25 microns The chlorovinyl film was obtained by preparing a film from a vinyl chloride/vinyl acetate (90/10) copolymer having a Fikentscher value K of 60. The non-lacquered face of the polychlorovinyl film was in contact with the adhesive-coated face of the polyolefinic film. The resulting bonded sheet had the following characteristics:
thickness: 48 microns
transmittance: 1%
permeability:
  to oxygen: 40 cm³/m².24 h.kg/cm²
  to carbon dioxide: 150 cm³/m².24 h.kg/cm²
  to water vapor: 2 g/m².24 h
weldability range: 90°–110° C.
resistance of the weld: 400 g/cm
resistance to perforation: 1000 g

What is claimed is:

1. A bonded sheet for packaging having a thickness of from 20 to 200 microns and consisting essentially of two films, one of which is obtained from chlorovinyl polymers and the other from olefinic polymers, and characterized in that one of the two films has, on its surface in contact with the other film, a metallized coating with a resistivity of from 1 to 5 Ohms, said chlorovinyl polymer film being a film, optionally stretched, prepared from polymers or copolymers of vinyl chloride, having a Fikentscher value K of from 40 to 80, and said polyolefinic film being a film, optionally oriented by stretching, prepared from a polymer selected from the class consisting of a polyethylene with a melt index of from 0.5 to 15, a polypropylene with a melt index of from 1 to 20, a crystalline propylene/ethylene copolymer containing from 0.1 to 15% by weight of ethylene and with a melt index of from 1 to 20, or mixtures thereof.

2. A bonded sheet according to claim 1, in which the metalized layer consists of aluminum.

3. A bonded sheet according to claim 1, in which at least one of the two films is oriented and is coated with a thermowelding layer.

* * * * *